INVENTOR
Paul A. Kendall

United States Patent Office 3,347,144
Patented Oct. 17, 1967

3,347,144
HIGH SPEED ELECTROMECHANICAL SHUTTER
FOR SPECTROGRAPHS
Paul A. Kendall, Kensington, Md., assignor to the United
States of America as represented by the Secretary of
the Navy
Filed June 29, 1965, Ser. No. 468,173
11 Claims. (Cl. 95—53)

ABSTRACT OF THE DISCLOSURE

An apparatus for providing high speed shutter operation to mechanically control the light entering a spectrograph. An opposing magnetic field is set up between a stationary coil and a movable driver ring. The driver ring is propelled at very high velocity, carrying the apertured shutter plate therewith.

---

The invention described herein may be manufactured and used by or for the Government of the United States of America for governmental purposes without the payment of any royalties thereon or therefor.

The present invention relates broadly to shutters and more particularly to an improved high-speed shutter mechanism for mechanically controlling, with microsecond precision, the light entering a spectrograph.

In the light gating mechanisms heretofore used for this purpose, wherein a movable slotted plate is propelled across the stationary spectrograph slit, various actuator means have been designed for propelling the slotted shutter plate. Among these are included the hairpin-shaped wire devices which under rapid thermal expansion thereof impart an impulse to the shutter plate and the electromechanical devices which use the opposing interacting magnetic field set up by a high current surge through a small flattened T-shaped actuating wire to instantaneously repel one movable segment of the wire from an immovable segment thereof and thus impart an impulse of forward motion to the shutter plate. The former actuator means has not proven to be entirely satisfactory because of the limited maximum shutter velocity obtainable therewith, the high stress concentration on the rear of the shutter plate due to the relatively small driver area, and the necessity of rebending the wire after each shot. In the latter means, described by this inventor in U.S. Patent No. 3,049,982, one is faced with the problem of having to reposition the light-weight shutter plate against the slight static spring force of the movable wire segment of the actuator in order to ready the device for each succeeding firing.

It is, therefore, an object of this invention to provide a new and improved high-speed electromechanical shutter for a spectrograph which is operable in the microsecond range.

Another object of the present invention is to provide a construction of electromechanical shutter having few movable parts, and in which all the movable parts are rigid bodies constructed of low mass material, thus enabling high acceleration of a movable shutter plate.

A further object of the invention is to provide a high-speed shutter capable of accurate and reliable high speed control and of such construction as to permit successive use of the low mass shutter plate.

Still another object of the invention is to provide a high-speed spectrograph shutter having a closed-open-closed light gating action which may be readily recycled for successive use without physical modification of any of the parts thereof.

Yet another object of the present invention is to provide an improved actuator for a spectrograph shutter mechanism which is capable of driving a substantially free-moving slotted shutter plate across a stationary spectrograph slit at greater acceleration and higher speeds than heretofore obtainable by similar devices in the art, which may easily be recycled for successive and repeated use, and which is simple in design and economical to manufacture.

In accordance with the aforementioned objects, this invention is practiced by providing a high-speed shutter mechanism for operating in the microsecond range comprising a fixed coil, a driver ring and a slotted shutter plate. A capacitor is discharged through the coil to set up opposing magnetic fields between the coil and the driver ring, thereby to drive forward the driver ring while the coil is held fixed in place. The shutter plate, having been positioned in abutting relationship with the driver ring, is driven forward in its raceway at a very high rate of speed whereas the movement of the actuating driver ring is restricted by a blocking means provided in its path by the framework of the device. The motion of the slot with respect to a stationary spectrograph slit results in a closed-open-closed light gating action. All movable parts in the device are constructed of a low mass material to enable the high acceleration desired of the movable shutter plate, including the driver section for the shutter plate, which is composed of two light-weight but rigid bodies, namely the fixed coil and the ring, so that no static spring force is encountered when repositioning the shutter plate for a succeeding firing, as was the case in this inventor's aforementioned patented shutter device, thus greatly increasing the ease and simplicity of preparing the shutter herein disclosed for successive firings.

The novel features that are considered characteristic of this invention are set forth in the appended claims; the invention itself, however, both as to its organization and method of operation, together with objects and advantages in addition to those stated above, will best be understood from the following description of a specific embodiment when read in conjunction with the accompanying drawings, in which:

Figure 1:
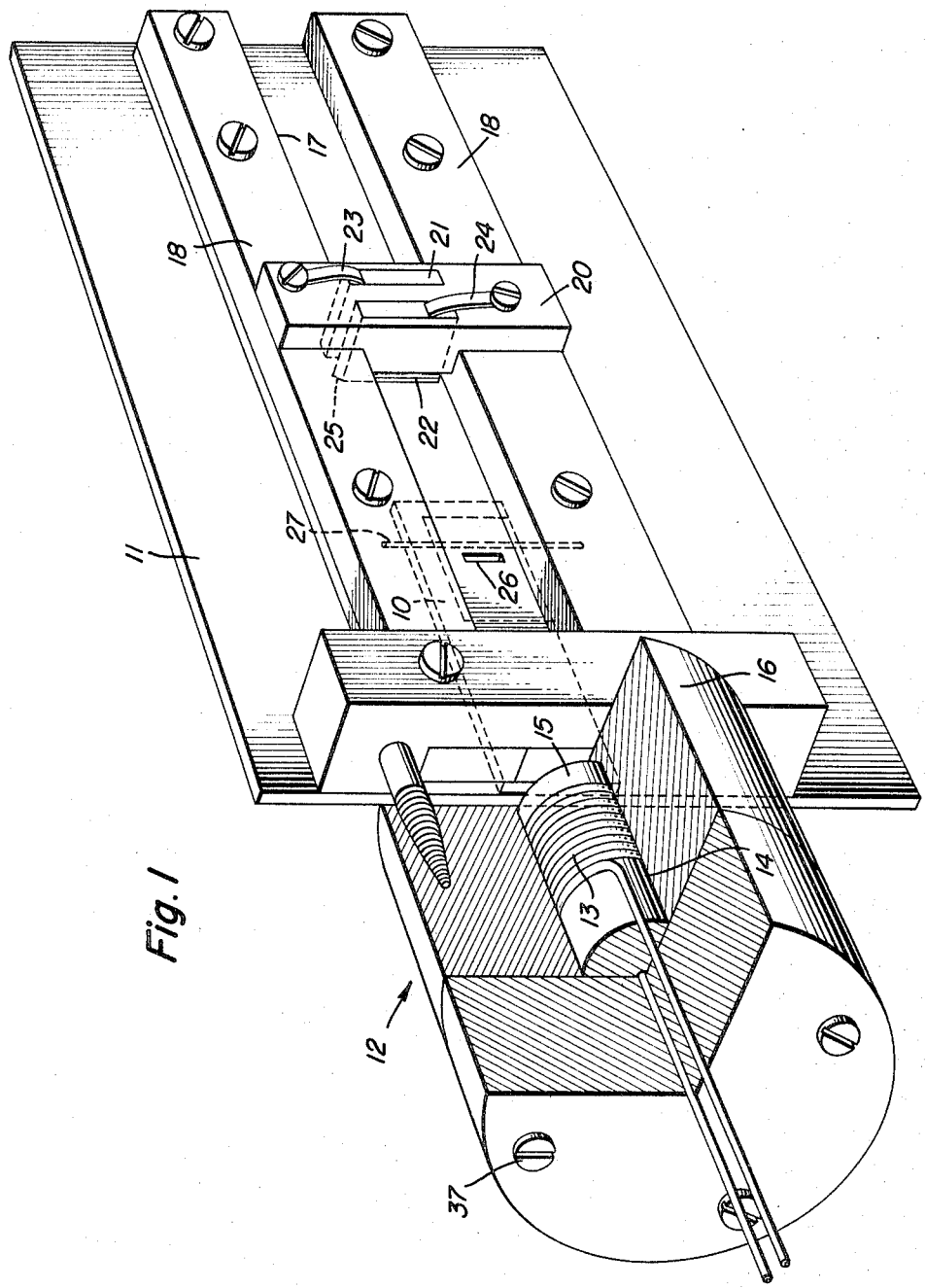
FIG. 1 is a perspective view, partly broken away to more clearly show the various components of the invention.

Referring now to the drawings wherein similar parts are designated by the same reference numerals there is shown in FIG. 1 an electromechanical shutter mechanism designed to operate in the microsecond range for controlling the recording period of a spectograph or other similar type equipment, comprising a shutter plate 10 movably associated with a spectograph face plate 11 and a driver section generally indicated by numeral 12 for propelling the shutter plate forward along the stationary face plate of the spectograph. The driver section 12 is composed of a coil 13 wound upon a cylindrical form 14, a driver ring 15, and a barrel-shaped member 16 surrounding the wound coil 13 and driver ring 15 to prevent extension of the coil radially of the form and to restrain movement of the driver ring axially thereof, as will be described hereinafter.

The spectograph face plate 11 is provided with a longitudinally extending rectangular channel 17 defined by a pair of elongated bar members 18 secured to the face plate in parallel, spaced relationship therewith and serving as a raceway for the freely movable untethered shutter plate 10. Near one end of the bar members 18 there is affixed thereto an arrestor and stop mechanism for decelerating, stopping and holding the shutter plate 10, after it has been propelled down the channel 17, thereby to complete the light gating action. The arrestor and stop mechanism shown herein is similar to that employed in the high speed shutter described in U.S. Patent No. 3,049,982 by this inventor and includes a seating block 20 having movably positioned thereon an arresting block 21 and a brakeshoe block 22, both of which are disposed transversely to the recessed raceway 17 and biased into abutment with face plate 11 by leaf springs 23 and 24, respectively. The brakeshoe block 22 is pivoted with an outwardly divergent beveled edge 25 facing the shutter plate 10 for abutting contact therewith to enable the shutter plate 10 to raise the brakeshoe block 22, transferring momentum thereto, as the shutter plate is propelled into contact with the block. Although the shutter plate 10 is able to move beneath brakeshoe block 22 sufficient frictional drag is produced thereby to further aid in decelerating the forward movement of the shutter plate. The leading edge of the shutter plate then comes into contact with the arresting block 21, disposed slightly behind the brakeshoe block 22. Upon contact therewith the shutter plate may rebound but is quickly brought to rest by the frictional drag provided on the top surface thereof by the brakeshoe block.

Near the other end of the bar members 18 the spectograph face plate 11 is secured to the driver section 12. The shutter plate 10 is positioned within the channel 17 with one end thereof disposed directly against the driver ring 15 whereby the forward thrust thereof, when the driver section is fired, may be imparted to the shutter plate to drive it down the raceway.

The shutter plate 10 is provided with a narrow slot therein, indicated at 26, for cooperating with a spectograph slit 27 in face plate 11, and is constructed of a high strength to weight ratio material, such as aluminum or phenolic. The low mass shutter may weigh, for example, only 0.25 gram and the material from which it is constructed must therefore have a high compression and impact strength so as to be able to withstand the extreme pressures imparted thereto during firing of the shutter. To more fully appreciate the light chopping qualities obtainable with the invention and to appreciate the dimensions of the apertures involved, for example, the slot 26 can have dimensions such as 0.030 inch in width, while the spectograph slit 27 may have a width of approximately 0.001 inch.

Figure 2:
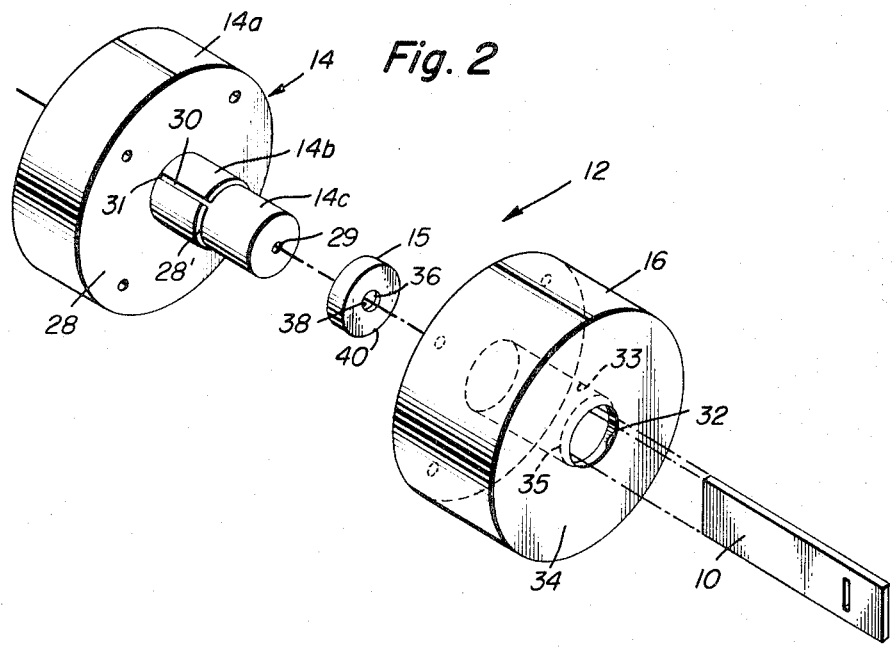
FIG. 2 is an exploded view of the driver section thereof.

Referring now to FIG. 2, the assembly of the driver section 12 will be apparent from the exploded view contained therein. Coil form 14 may be seen as comprising three coaxial cylindrical sections 14a, 14b, 14c integrally constructed from a plastic, as for example, phenolic, such as by first reducing the diameter of a cylinder 14a along a portion of the length thereof by cutting away an annular portion at one end thereof, thereby forming a coaxial cylindrical portion 14b extending from one end of the cylinder 14a and integrally joined thereto at a shoulder 28, and thereafter reducing the diameter of the cylinder 14b along a portion of the length thereof by cutting away an annular portion from the end thereof remote from cylindrical portion 14a, thereby forming a coaxial cylindrical portion 14c extending from one end of the cylindrical portion 14b and integrally joined thereto at a shoulder 28'. An axial bore 29 is formed through the coil form 14 for reception therethrough of the wire forming coil 13, and cylindrical portion 14b of the coil form is provided with a longitudinal groove 30 along the exterior surface thereof aligned with an aperture 31 in cylindrical portion 14a for permitting passage of the wire therefrom after it has been wound upon the cylindrical portion 14c. The diameter of the wire forming coil 13 is substantially the same as the radial length of shoulder 28' so that when wound tightly about the cylindrical portion 14c the coil 13 thereby formed will have a diameter substantially the same as that of cylindrical portion 14b. Obviously the coil form 14 could be molded rather than machined as described above.

The barrel 16, which also is composed of phenolic or a similar suitable plastic, is provided with a bore 32 therethrough having a counterbore 33 extending substantially along the entire length thereof, but terminating just short of the end 34 of barrel 16 to form a shoulder 35. Cylindrical-shaped driver ring 15 is hollowed-out at one end thereof to form a cylindrical recess 36 therein terminating in a flat driving area 40 at the other end thereof provided with a central circular aperture 38 somewhat smaller in diameter that the diameter of the recess 36, and is slidably positioned within the counterbore 33 of barrel 16 with the flat driving end thereof facing into the barrel towards shoulder 35. The barrel 16 is secured to the coil form 14 by any suitable means, such as the screws 37 shown in FIG. 1, with cylindrical portions 14b, 14c and coil 13 wound thereon being positioned within the counterbore 33 of the barrel 16. The diameters of the cylindrical portion 14b, the wound coil 13, the driver ring 15 and the counterbore 33 in barrel 16 are substantially equal so that when secured to the form 14 in abutment with shoulder 28 thereof the barrel 16 will serve to contain coil 13 in its wound state, preventing any diametrical change in the characteristics thereof. The driver section 12 is then secured to the spectograph face plate 11 and the shutter plate 10 is manually guided in channel 17 towards the driver section until the end portion thereof passes through bore 32 and engages the flat end wall 40 of driver ring 15, thereby urging the annular end portion of driver ring 15 into a position of contacting relationship with coil 13 with end wall 40 spaced from the shoulder 35 within barrel 16. Operation of the driver section 12 is achieved by releasing a surge of electrical current through the coil 13. This induces a current in the aluminum driver ring 15 having associated therewith, in accordance with Lenz's law, a magnetic field opposing that of the coil 13. Since the coil 13 is held rigid by the coil form 14 and barrel 16, the driver ring 15 is repelled therefrom, thus imparting a high speed impulse to the movable shutter plate 10 and accelerating it along the raceway 17. Driver ring 15 meanwhile is restrained from continuous movement with the shutter plate 10, its movement being restricted by shoulder 35 in barrel 16 against which the end wall 40 thereof is designed to contact.

Figure 3:
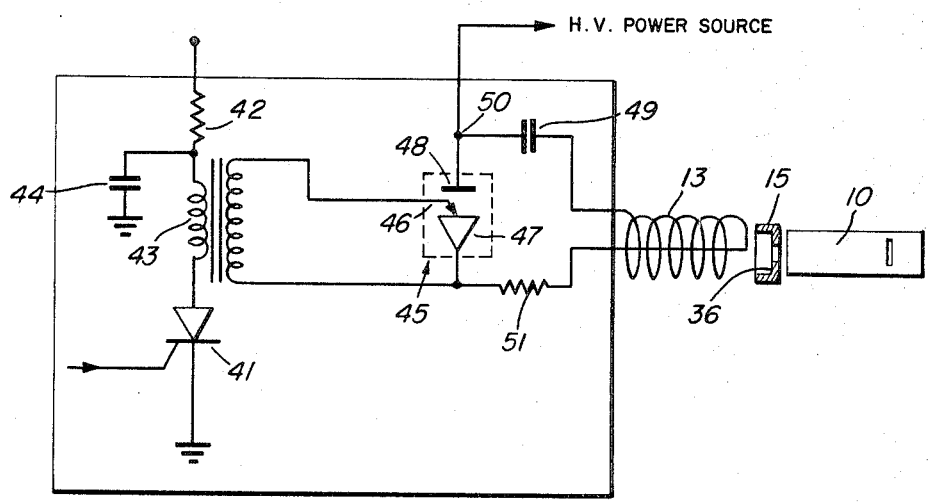
FIG. 3 is a diagrammatic view of the electrical circuit controlling the electromechanical shutter of this invention.

In FIG. 3 there is shown a schematic diagram of an electrical discharge circuit for supplying a heavy current surge pulse to the coil 13. It may be seen that an input pulse supplied by an available and suitable triggering means will actuate the silicon controlled rectifier 41, causing a current surge through the primary winding of a pulse transformer 43. A capacitor 44 is provided in the circuit, connected between a current limiting resistor 42 and the primary winding of transformer 43 and passing to ground. The pulse transformer 43, of approximately a 1:2 ratio, is thus connected for effective and reliable pulsing, or firing of the ignitron indicated generally at 45.

As shown, the secondary winding of pulse transformer 43 is connected directly across ignitor 46 and cathode 47 of the ignitron 45. The plate 48 of the ignitron 45 is connected to one side of energy storage capacitor 49, and as indicated at 50, to a high voltage power supply. This high voltage power supply, for example, may supply voltages in the range of 0–6,000 volts and is used to charge the energy storage capacitor 49. The opposite end of energy storage capacitor 49 is connected to the wire forming coil 13, which in turn is connected to the cathode 47 of the ignitron. A damping resistor 51 may be provided between the coil 13 and cathode 47.

When the silicon controlled rectifier 41 is triggered the secondary winding of pulse transformer 43 delivers a positive pulse of approximately 800 volts to the ignitor 46 to trigger the ignitron 45. When the ignitron is triggered it acts as a high speed switch and switches the high voltage charge of the energy storage capacitor 49 through the coil 13, causing a heavy current surge therethrough. The current waveform is a damped sinusoidal waveform lasting approximately 20 microseconds with a maximum half-cycle magnitude in the approximate range of 2,000–6,000 amperes. The initial D.C. charge stored in energy storage capacitor 49 to produce such a current surge is in the approximate range of 2,000–5,000 volts.

The high current surge through the coil 13 sets up strong opposing magnetic fields about the coil 13 and aluminum ring 15 due to the current flow induced therein in opposite directions, as hereinabove explained, and since the coil 13 is held fixed within barrel 16 about the cylindrical portion 14c of form 14, the repulsion force between coil 13 and driver ring 15 causes the driver ring to be repulsed therefrom, thus causing the abutting shutter plate 10 to be propelled by the driver ring 15.

It may be seen therefore that an improved high speed shutter has been provided, having a driver section which consists mainly of two rigid bodies, the coil 13 and the ring 15. With this driver section no static spring force is encountered in repositioning the shutter plate 10. This feature greatly increases the ease and simplicity of preparing the shutter for each firing. In fact this shutter could easily be modified to be re-seated remotely and automatically with a simple solenoid return mechanism. This shutter also has been fired nearly twice as fast as any shutters heretofore reported, i.e., 5,000 cm./second, and conceivably could be fired at even higher velocities by increasing the duration of the present 20 microsecond current surge.

Although the circuit shown in FIG. 3 illustrates one manner of providing a high current surge through the coil it is to be understood that such a current surge can be controlled by other types of high discharge current switches and produced by other types of pulse forming networks.

Obviously many modifications and variations of the present invention are possible in the light of the above teachings. It is therefore to be understood that within the scope of the appended claims, the invention may be practiced otherwise than as specifically described.

What is claimed is:

1. A high-speed shutter mechanism comprising:
    a freely movable high-speed shutter element having a light aperture therein,
    means to support and guide the shutter element during movement thereof having a light aperture therein for instantaneous registration with the light aperture of the shutter element,
    a fixed coil adjacent said support and guide means,
    a driver ring positioned between said coil and said shutter element in contacting relationship therewith and movable in the direction of the shutter element over a limited range only, and
    electrical means for passing a surge of current through the coil to thereby establish opposing magnetic fields in the coil end of the ring so that a propelling force is transmitted to the ring for driving therewith at a high rate of acceleration the juxtapositioned shutter element.

2. The shutter mechanism as defined in claim 1 wherein said fixed coil comprises a molded cylindrical member having a reduced diameter portion at one end thereof,
    a coil structure wound upon the reduced portion of the cylindrical member, and
    a coil barrel surrounding the cylindrical member and maintaining the coil structure in its position on said member, said barrel being provided with means for attachment to said support and guide means.

3. The shutter mechanism of claim 2 wherein said molded cylindrical member and said coil barrel are composed of plastic.

4. The shutter mechanism as defined in claim 1 wherein said driver ring is composed of aluminum.

5. The shutter mechanism as defined in claim 1 wherein said shutter element is composed of aluminum.

6. The shutter mechanism of claim 3 wherein said shutter element and said driver ring are composed of aluminum.

7. The shutter mechanism as defined in claim 1 wherein said electrical means comprises a high voltage capacitor discharge circuit.

8. The shutter mechanism as defined in claim 1 and further including arresting means connected to said support and guide means for arresting the movement of the shutter element.

9. In a high-speed shutter mechanism having a freely movable, lightweight, slotted shutter element and a support for guiding the shutter element along a given path, said support being provided with a slit for instantaneously registering with the slot of the shutter element during movement thereof, the improvement being an actuator for producing mechanical movement of the shutter element at high speeds, said actuator comprising:
    a coil fixed to the support with the axis thereof substantially aligned with the path of movement of the shutter element,
    a cup-shaped driver ring in which the diameter of the exterior surface thereof is substantially the same as that of the coil, said ring being positioned between the coil and the shutter element, with one end thereof being adjacent said coil in axial alignment therewith, and the other end thereof being in contact with the shutter element, and
    a high-voltage capacitor discharge circuit means for passing a surge of current through the coil to thereby set up opposing magnetic fields in the coil and driver ring so that a force is transmtited to the ring propelling it away from the coil, thus providing an accelerating impulse to the shutter element.

10. A method of propelling a shutter element at high speed along a guideway provided therefor in a support structure comprising the steps of:
    positioning two conductive members in a line with the shutter element,
    passing a surge of current through one of said members to induce a current in the other having associated therewith a magnetic field opposing that of said one of said members,
    and holding the conductive member most remote from said shutter element in a fixed position,
    whereby the conductive member adjacent to said shutter element is driven in the direction of the shutter element so as to ballistically propel the shutter element along said support structure guideway.

11. A high-speed shutter mechanism comprising:
    a freely movable high-speed shutter element having a light aperture therein,
    means to support and guide the shutter element during movement thereof having a light aperture therein for instantaneous registration with the light aperture of said shutter element,
    a stationary coil adjacent said support and guide means,
    a driver ring positioned between said coil and said shutter element in contacting relationship therewith and movable relative to said stationary coil in the direction of the shutter element with a range of travel less than that of said shutter element and, electrical means for passing a surge of current through said coil to thereby establish opposing magnetic fields in the coil end of said ring so that a propelling force is transmitted to said ring for driving therewith at a high rate of acceleration said shutter element.

References Cited

UNITED STATES PATENTS 3,049,982  8/1962  Kendall _____ 95—55
3,176,170  3/1965  Fulton _____ 310—12

JOHN M. HORAN, *Primary Examiner.*